United States Patent
Chang

(10) Patent No.: US 6,789,926 B2
(45) Date of Patent: Sep. 14, 2004

(54) LIGHT-GENERATING BICYCLE PEDAL

(76) Inventor: Chih-Jung Chang, No. 7, Yung-Li 2nd St., Chia-Yi City (TW)

( * ) Notice: Subject to any disclaimer, the term of this patent is extended or adjusted under 35 U.S.C. 154(b) by 122 days.

(21) Appl. No.: 10/170,254

(22) Filed: Jun. 12, 2002

(65) Prior Publication Data

US 2002/0152835 A1 Oct. 24, 2002

Related U.S. Application Data

(63) Continuation-in-part of application No. 09/814,448, filed on Mar. 22, 2001, now abandoned.

(30) Foreign Application Priority Data

Oct. 31, 2001 (TW) ........................................ 90218650 U

(51) Int. Cl.$^7$ .............................................. F21L 13/00
(52) U.S. Cl. ........................ 362/473; 362/192; 362/545; 362/543
(58) Field of Search ................................ 362/473, 192, 362/545, 543

(56) References Cited

U.S. PATENT DOCUMENTS

| 5,624,175 | A | * | 4/1997 | Gelormino et al. | ......... 362/473 |
| 5,702,172 | A | * | 12/1997 | Kilburn | ...................... 362/473 |
| 6,109,770 | A | * | 8/2000 | Choimet et al. | ............ 362/473 |
| 6,550,945 | B2 | * | 4/2003 | Chiu | .......................... 362/473 |

* cited by examiner

Primary Examiner—Stephen Husar
Assistant Examiner—Anabel Ton
(74) Attorney, Agent, or Firm—Cook, Alex, McFarron, Manzo, Cummings & Mehler, Ltd.

(57) ABSTRACT

A light-generating bicycle pedal includes an axle, a pedal body mounted on the axle, and a light-generating unit including a magnet wheel, a coil device and a lamp unit. The pedal body is formed with a board receiving cavity to receive a circuit board of the lamp unit. The coil device includes a set of anchoring lugs to be anchored in a set of anchoring holes in the circuit board. Rotation of the axle relative to the pedal body results in rotation of the magnet wheel relative to the coil device, thereby inducing electrical currents in the coil device that are provided to the lamp unit via the anchoring lugs so as to enable the lamp unit to generate a light output.

9 Claims, 5 Drawing Sheets

LIGHT-GENERATING BICYCLE PEDAL

CROSS-REFERENCE TO RELATED APPLICATION

This application claims priority of Taiwanese application no. 090218650, filed on Oct. 31, 2001

This application is also a continuation-in-part of U.S. patent application Ser. No. 09/814,448, filed by the applicant on Mar. 22, 2001 now abandoned, the entire disclosure of which is incorporated herein by reference.

BACKGROUND OF THE INVENTION

1. Field of the Invention

The invention relates to a bicycle pedal, more particularly to a light-generating bicycle pedal.

2. Description of the Related Art

In co-pending U.S. patent application Ser. No. 09/814,448, the applicant disclosed a bicycle pedal that includes a pedal body, an axle and a light-generating unit. The pedal body is formed with a tubular axle sleeve having an axle hole with front and rear ends, a cage member disposed around and connected to the axle sleeve, and a generator chamber adjacent to one of the front and rear ends of the axle hole. The axle extends into the axle hole, is coupled rotatably to the axle sleeve, and is formed with a wheel-mounting portion that is disposed in the generator chamber. The light-generating unit includes a magnet wheel disposed in the generator chamber and mounted coaxially and co-rotatably on the wheel-mounting portion of the axle, a coil device disposed in the generator chamber around the magnet wheel and mounted on the pedal body, and a lamp unit connected electrically to the coil device and mounted on the cage member.

Rotation of the axle relative to the pedal body results in rotation of the magnet wheel relative to the coil device, thereby inducing electrical currents in the coil device that are provided to the lamp unit so as to enable the lamp unit to generate a light output.

It is desirable to improve the aforesaid bicycle pedal to simplify the manufacturing process thereof.

SUMMARY OF THE INVENTION

Therefore, the main object of the present invention is to provide a light-generating bicycle pedal having simpler interconnections among components of a light-generating unit thereof.

Accordingly, a light-generating bicycle pedal of this invention comprises:

a pedal body formed with a tubular axle sleeve having an axle hole with front and rear ends, a cage member disposed around and connected to the axle sleeve, and a generator chamber disposed adjacent to one of the front and rear ends of the axle hole, the cage member including a pair of lateral cage portions that extend parallel to the axle sleeve and that are disposed respectively on opposite lateral sides of the axle sleeve, at least one of the lateral cage portions having an outer wall surface formed with a board receiving cavity;

an axle extending into the axle hole and coupled rotatably to the axle sleeve; and a light-generating unit including a magnet wheel disposed in the generator chamber and mounted coaxially and co-rotatably on the axle, a coil device disposed in the generator chamber around the magnet wheel and mounted on the pedal body, and a lamp unit connected electrically to the coil device and mounted on the cage member.

The coil device includes a spool, a coil wound around the spool, and a pair of conductive caps capped on an assembly of the spool and the coil. Each of the conductive caps is connected electrically to a respective end of the coil. The conductive caps are formed with a set of anchoring lugs.

The lamp unit includes a circuit board received in the board receiving cavity and having at least one lamp mounted thereon. The circuit board is formed with a set of anchoring holes that permit extension of the set of anchoring lugs therein so as to establish electrical connection between the lamp unit and the coil device.

Rotation of the axle relative to the pedal body results in rotation of the magnet wheel relative to the coil device, thereby inducing electrical currents in the coil device that are provided to the lamp unit via the anchoring lugs on the conductive caps so as to enable the lamp unit to generate a light output.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENTS

Figure 1:
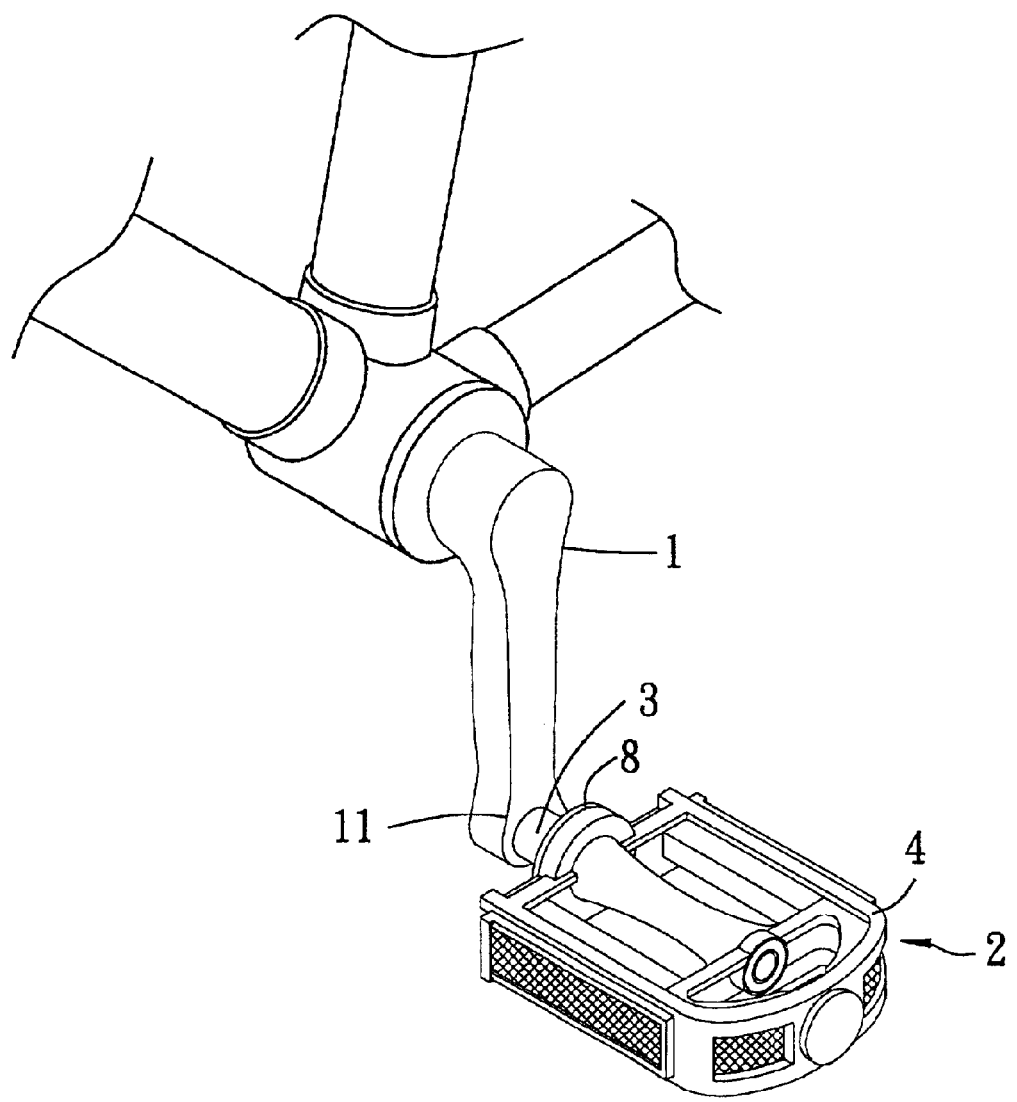
FIG. 1 is a perspective view showing a preferred embodiment of a bicycle pedal according to the present invention when mounted on one end of a crank.
Figure 2:
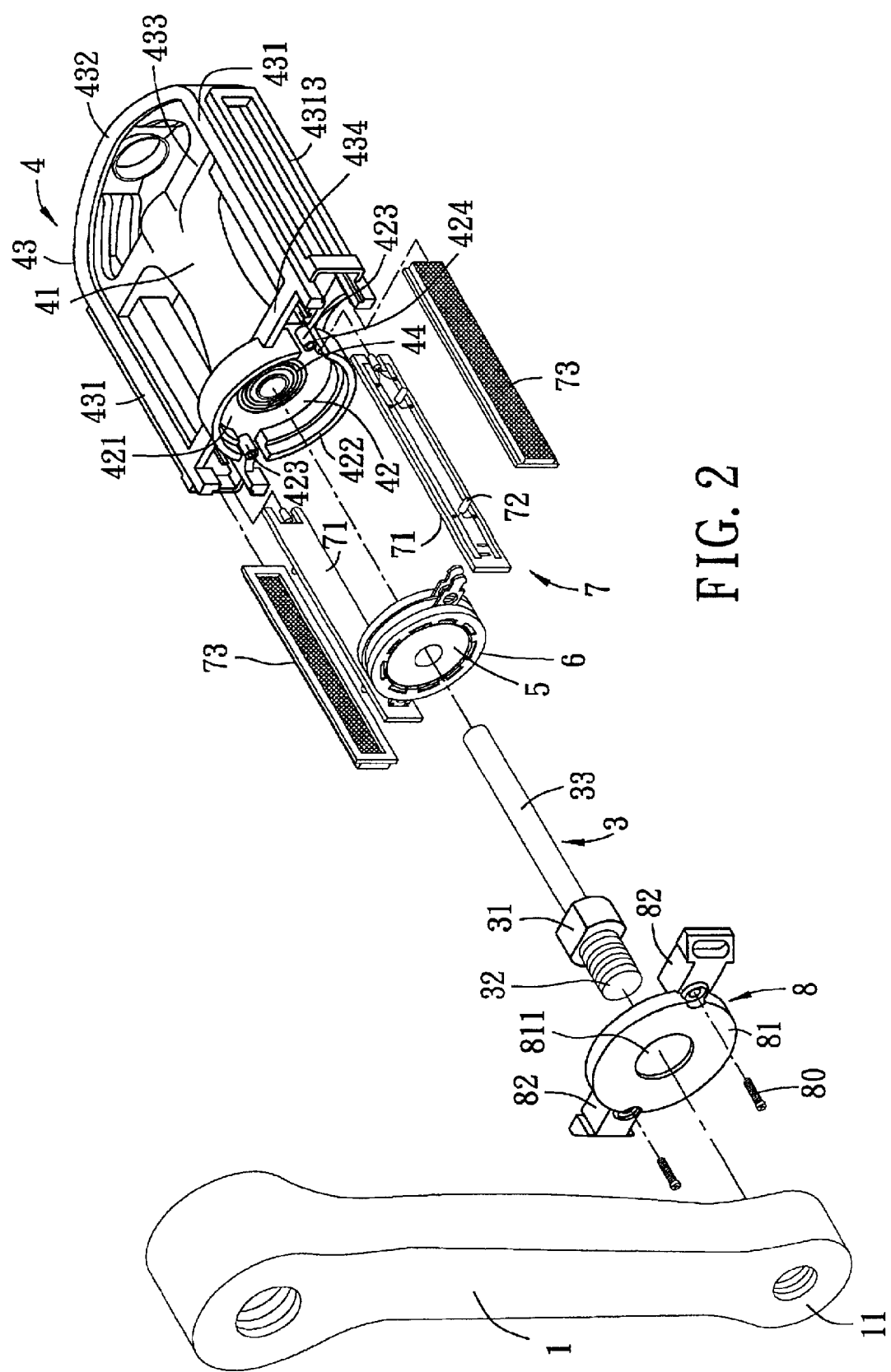
FIG. 2 is an exploded perspective view of the preferred embodiment.

Referring to FIGS. 1 and 2, the preferred embodiment of a light-generating bicycle pedal 2 according to the present invention is shown to be adapted to be mounted on one end portion 11 of a crank 1. The bicycle pedal 2 includes an axle 3, a pedal body 4, a cover plate 8 and a light-generating unit.

The pedal body 4 is formed with a tubular axle sleeve 41 having an axle hole 411 (see FIG. 3) with front and rear ends, a cage member 43 disposed around and connected to the axle sleeve 41, and a generator chamber 42 disposed adjacent to the rear end of the axle hole 411. A pair of axle bearings 44 are disposed in the axle hole 411 for smoothening the relative rotation between the axle 3 and the pedal body 4.

Figure 3:
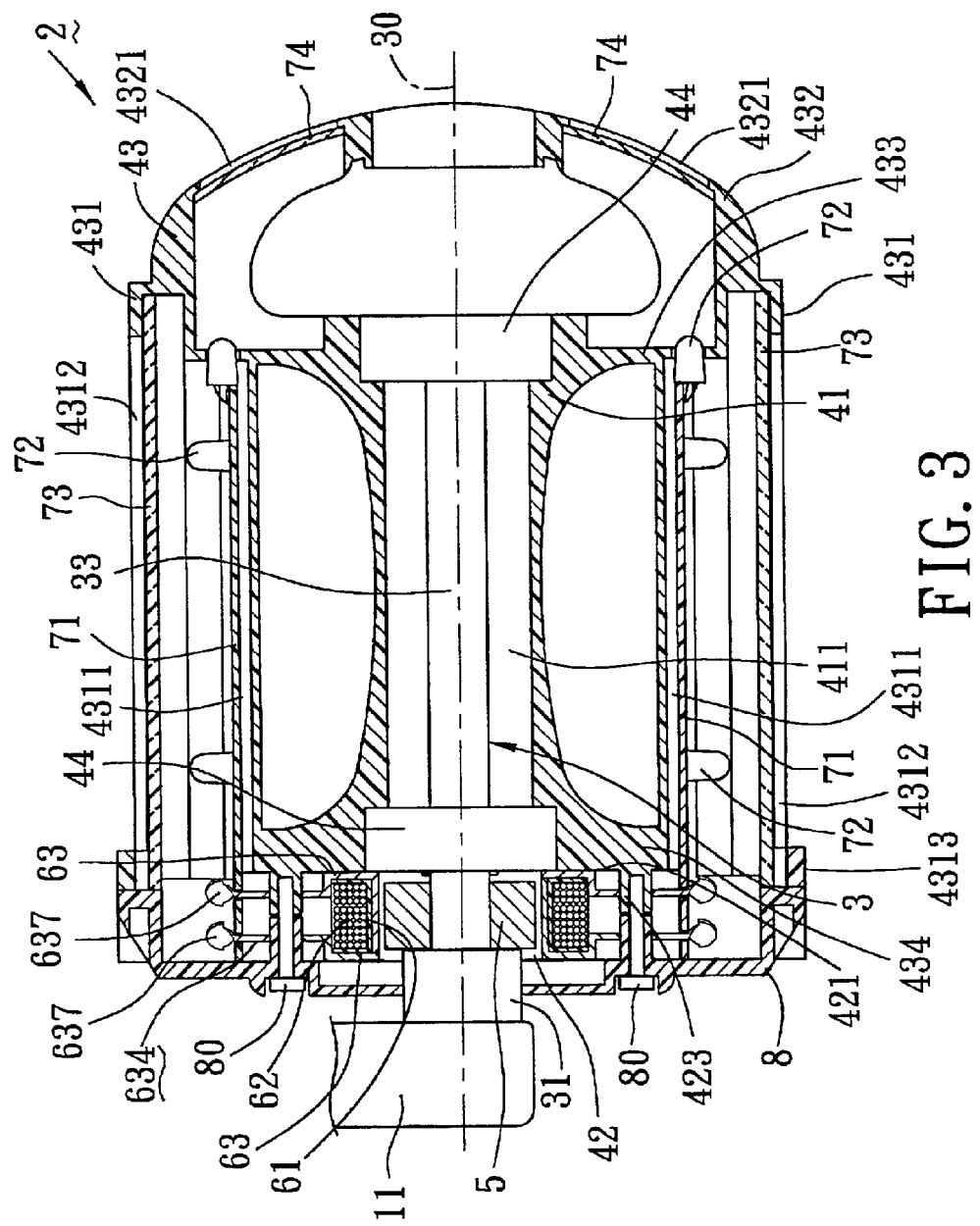
FIG. 3 is a sectional schematic view of the preferred embodiment.
Figure 4:
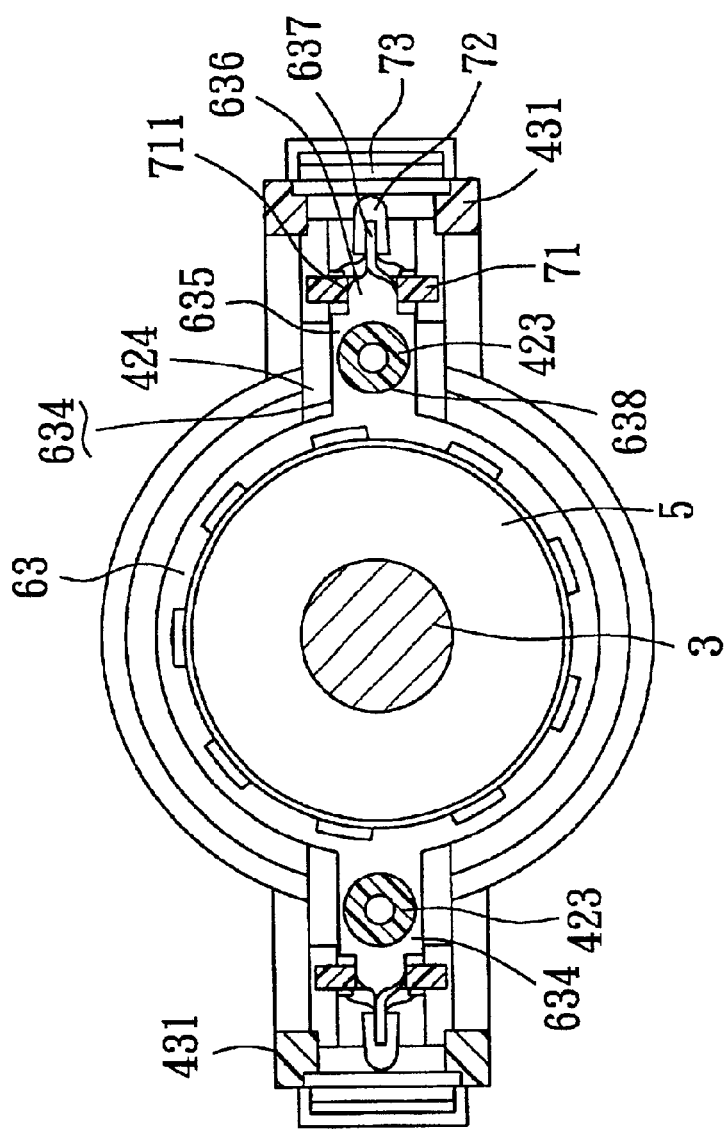
FIG. 4 is a partly sectional view of the preferred embodiment to illustrate the connection between a coil device and a lamp unit.

Referring further to FIGS. 3 and 4, the cage member 43 includes a pair of lateral cage portions 431 that extend parallel to the axle sleeve 41 and that are disposed respectively on opposite lateral sides of the axle sleeve 41, a bridging portion 432 that interconnects front ends of the lateral cage portions, and a front end wall 433 and a rear end wall 434, each of which interconnects the axle sleeve 41 and the lateral cage portions 431. In this embodiment, each of the lateral cage portions 431 has an outer wall surface 4313 formed with a board receiving cavity 4311 and a plate receiving cavity 4312. The plate receiving cavity 4312 is disposed outboard relative to the board receiving cavity 4311. Each board receiving cavity 4311 and plate receiving cavity 4312 has an open rear end at the rear end wall 434. The bridging portion 432 is formed with two lamp holes 4321. The front end wall 433 is formed with two lamp-mounting holes that are registered with the lamp holes 4321, respectively. The generator chamber 42 is confined by an annular base 421 on the rear end wall 434, and an annular wall 422 that extends from the periphery of the annular base 421. The annular wall 422 is formed with a pair of notches 424. Each of two mounting posts 423 projects from the rear end wall 434 and into a respective one of the notches 424.

The axle 3 has an axis 30 and is formed with a pedal coupling portion 33 that extends into the axle hole 411 and that is coupled rotatably to the axle sleeve 41 via the axle bearings 44, a crank coupling portion 32 that extends rearwardly and coaxially from the pedal coupling portion 33, that extends out of the rear end of the axle hole 411 and the generator chamber 42, and that is adapted to be secured to the end portion 11 of the crank 1, and an annular flange 31 that is disposed between the pedal coupling portion 33 and the crank coupling portion 32 to limit threaded engagement between the crank coupling portion 32 and the crank 1.

The light-generating unit includes a magnet wheel 5 disposed in the generator chamber 42 and mounted coaxially and co-rotatably on the axle 3, a coil device 6 disposed in the generator chamber 42 around the magnet wheel 5 and mounted on the pedal body 4, and a lamp unit 7 connected electrically to the coil device 6 and mounted on the cage member 43.

Figure 5:
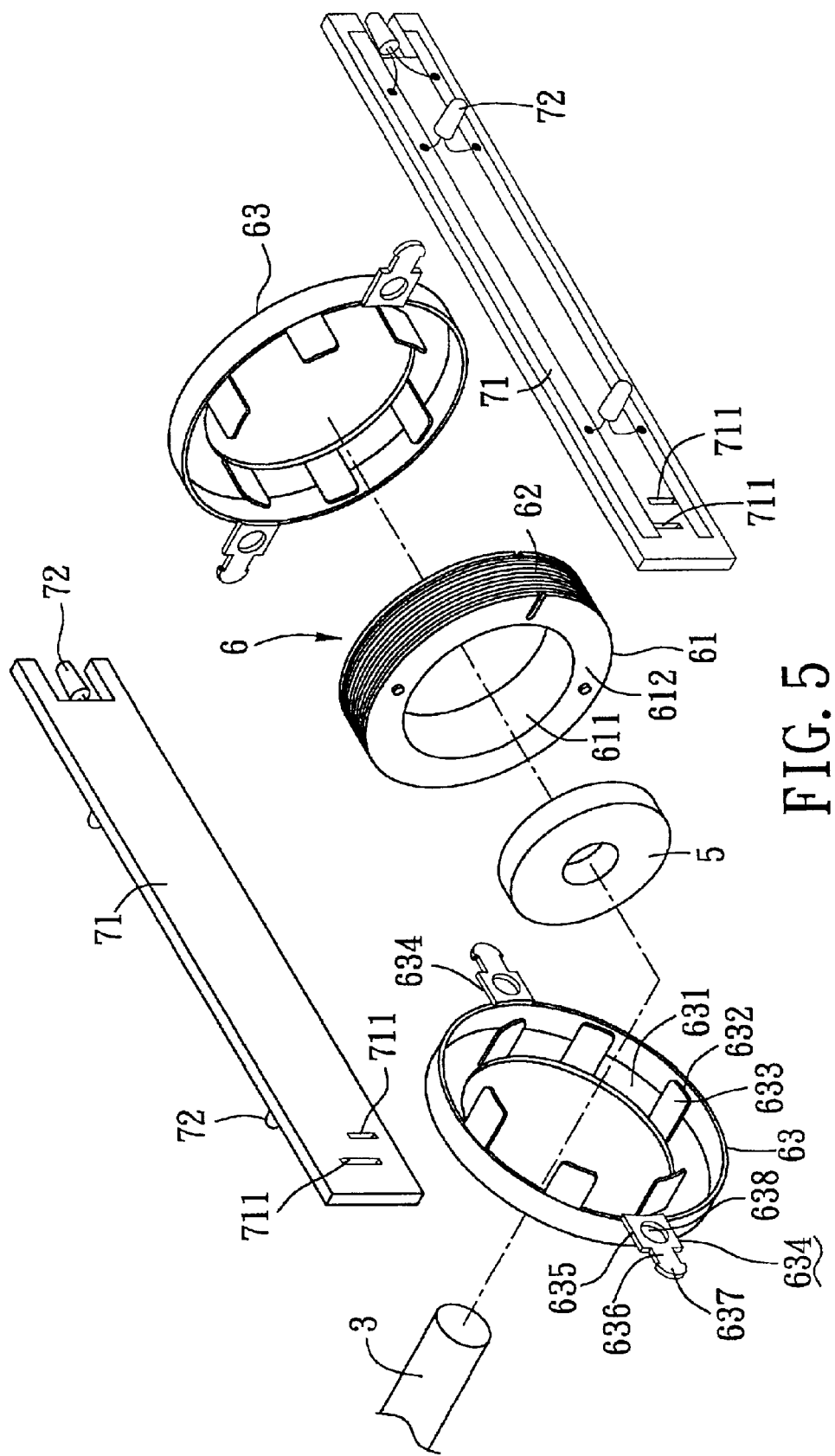
FIG. 5 is an exploded perspective view showing a light-generating unit of the preferred embodiment.

Referring further to FIG. 5, the coil device 6 includes a spool 61, a coil 62 wound around the spool 61, and a pair of conductive caps 63 capped on an assembly of the spool 61 and the coil 62. The spool 61 includes an enveloping ring 611 that surrounds the magnet wheel 5 along the axis 30 and a pair of horizontal rings 612, each of which extends radially relative to the axis 30 from one peripheral rim of the enveloping ring 611. Each of the conductive caps 63 is connected electrically to a respective end of the coil 62. Each conductive cap 63 includes a horizontal ring 631 that extends in radial directions relative to the axis 30 and that has an inner circular edge and an outer circular edge, an annular wall 632 that extends perpendicularly from the outer circular edge of the horizontal ring 631, a plurality of finger plates 633 that extend perpendicularly and spacedly from the inner circular edge of the horizontal ring 631, and a pair of anchoring lugs 634 that extend radially outward from the annular wall 632 and that are diametrically opposite to each other. Each of the anchoring lugs 634 includes a wider base section 635 extending from the conductive cap 63 and matching the corresponding notch 424 in the annular wall 422, a restricted neck section 636 extending from the base section 635, and a head section 637 extending from the neck section 636. The base section 635 is formed with a positioning hole 638 to permit the mounting post 423 in the corresponding notch 424 to pass therethrough.

In this embodiment, the lamp unit 7 includes two circuit boards 71 and a plurality of lamps 72 mounted on the circuit boards 71. Each of the circuit boards 71 is inserted into a respective board receiving cavity 4311 via an open rear end of the latter, and has an end portion that is formed with a set of anchoring holes 711 and that extends out of the open rear end of the respective board receiving cavity 4311. Each anchoring hole 711 permits extension of one of the anchoring lugs 634 therein so as to establish electrical connection between the lamp unit 7 and the coil device 6. In this embodiment, the restricted neck section 636 of the anchoring lugs 636 extends into the respective anchoring hole 711, and the head section 637 is subsequently twisted relative to the restricted neck section 636 to interconnect the circuit board 71 and the coil device 6. The lamps 72 are distributed on the circuit boards 71. Two of the lamps 72 extend into the lamp-mounting holes in the front end wall 433. Each of two light-transmissive cover plates 73 is inserted into a respective plate receiving cavity 4312 via the open rear end of the latter so as to cover the adjacent board receiving cavity 4311. Each of two light-transmissive cover plates 74 is mounted on the bridge portion 432 to close a respective lamp hole 4321.

Referring back to FIGS. 2 and 3, the cover plate 8 is mounted on the pedal body 4 at the mounting posts 423 via screws 80. The cover plate 8 includes a planar ring 81 to cover the generator chamber 42, and a pair of winged portions 82 radially extending from the planar ring 81 to cover the open rear ends of the board receiving cavities 4311 and the plate receiving cavities 4312. The cover plate 8 is formed with an axle hole 811 for extension of the crank coupling portion 32 therethrough.

Referring to FIGS. 2, 3 and 5, during assembly, the coil 62 is first wound around the spool 61, and the conductive caps 63 are then disposed to enclose the spool 61. Thereafter, the anchoring lugs 634 on the conductive caps 63 are extended through the anchoring holes 711 in the circuit boards 71. After the head sections 637 of the anchoring lug 634 are extended out of the anchoring holes 711 and are twisted by a 90 angle relative to the restricted neck sections 636, electrical connection between the coil device 6 and each circuit board 71 is established. Then, each of the circuit boards 71 is inserted into the respective board receiving cavity 4311, each of the light-transmissive cover plates 73 is inserted into the respective plate receiving cavity 4313, and each of the light-transmissive cover plates 74 is mounted on the bridge portion 432. Finally, the cover plate 8 is mounted on the pedal body 4 to complete the assembly process.

In use, rotation of the axle 3 relative to the pedal body 4 results in rotation of the magnet wheel 5 relative to the coil device 6, thereby inducing electrical currents in the coil device 6 that are provided to the lamp unit 7 via the anchoring lugs 634 on the conductive caps 63 so as to enable the lamp unit 7 to generate a light output. The light-transmissive cover plates 73, 74 enhance dispersion of light from the lamps 72 to yield a better alarming effect.

In summary, in view of the use of the anchoring lugs 634 for interconnecting the coil device 6 and the lamp unit 7, the manufacturing process of the light-generating bicycle pedal of this invention is accordingly simplified.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A light-generating bicycle pedal comprising:
    a pedal body formed with a tubular axle sleeve having an axle hole with front and rear ends, a cage member disposed around and connected to said axle sleeve, and a generator chamber disposed adjacent to one of said front and rear ends of said axle hole, said cage member including a pair of lateral cage portions that extend parallel to said axle sleeve and that are disposed respectively on opposite lateral sides of said axle sleeve, at least one of said lateral cage portions having an outer wall surface formed with a board receiving cavity;

an axle extending into said axle hole and coupled rotatably to said axle sleeve; and a light-generating unit including a magnet wheel disposed in said generator chamber and mounted coaxially and co-rotatably on said axle, a coil device disposed in said generator chamber around said magnet wheel and mounted on said pedal body, and a lamp unit connected electrically to said coil device and mounted on said cage member;

said coil device including a spool, a coil wound around said spool, and a pair of conductive caps capped on an assembly of said spool and said coil, each of said conductive caps being connected electrically to a respective end of said coil, said conductive caps being formed with a set of anchoring lugs;

said lamp unit including a circuit board received in said board receiving cavity and having at least one lamp mounted thereon, said circuit board being formed with a set of anchoring holes that permit extension of said set of anchoring lugs therein so as to establish electrical connection between said lamp unit and said coil device;

wherein rotation of said axle relative to said pedal body results in rotation of said magnet wheel relative to said coil device, thereby inducing electrical currents in said coil device that are provided to said lamp unit via said anchoring lugs on said conductive caps so as to enable said lamp unit to generate a light output;

wherein each of said anchoring lugs includes: a wider base section extending from one of said conductive caps, a restricted neck section extending from said base section and into one of said anchoring holes, and a head section extending from said neck section and twisted relative to said neck section to interconnect said circuit board and said coil device.

2. A light-generating bicycle pedal comprising:

a pedal body formed with a tubular axle sleeve having an axle hole with front and rear ends, a cage member disposed around and connected to said axle sleeve, and a generator chamber disposed adjacent to one of said front and rear ends of said axle hole, said cage member including a pair of lateral cage portions that extend parallel to said axle sleeve and that are disposed respectively on opposite lateral sides of said axle sleeve, at least one of said lateral cage portions having an outer wall surface formed with a board receiving cavity;

an axle extending into said axle hole and coupled rotatably to said axle sleeve; and a light-generating unit including a magnet wheel disposed in said generator chamber and mounted coaxially and co-rotatably on said axle, a coil device disposed in said generator chamber around said magnet wheel and mounted on said pedal body, and a lamp unit connected electrically to said coil device and mounted on said cage member;

said coil device including a spool, a coil wound around said spool, and a pair of conductive caps capped on an assembly of said spool and said coil, each of said conductive caps being connected electrically to a respective end of said coil, said conductive caps being formed with a set of anchoring lugs;

said lamp unit including a circuit board received in said board receiving cavity and having at least one lamp mounted thereon, said circuit board being formed with a set of anchoring holes that permit extension of said set of anchoring lugs therein so as to establish electrical connection between said lamp unit and said coil device;

wherein rotation of said axle relative to said pedal body results in rotation of said magnet wheel relative to said coil device, thereby inducing electrical currents in said coil device that are provided to said lamp unit via said anchoring lugs on said conductive caps so as to enable said lamp unit to generate a light output;

wherein said board receiving cavity has an open rear end, said circuit board being inserted into said board receiving cavity via said open rear end and having an end portion that is formed with said anchoring holes and that extends out of said open rear end of said board receiving cavity.

3. The light-generating bicycle pedal as claimed in claim 2, wherein said outer wall surface of said at least one of said lateral cage portions is further formed with a plate receiving cavity that is disposed outboard relative to said board receiving cavity and that has an open rear end, said light-generating bicycle pedal further comprising a light-transmissive plate inserted into said plate receiving cavity via said open rear end of said plate receiving cavity so as to cover said board receiving cavity.

4. The light-generating bicycle pedal as claimed in claim 2, wherein said generator chamber is formed adjacent to said rear end of said axle hole, said axle being formed with a pedal coupling portion that extends into said axle hole and that is coupled rotatably to said axle sleeve, and a crank coupling portion that extends rearwardly and coaxially from said pedal coupling portion, that extends out of said rear end of said axle hole and said generator chamber, and that is adapted to be secured to a crank.

5. The light-generating bicycle pedal as claimed in claim 4, wherein said cage member further has a rear end wall that interconnects said axle sleeve and said lateral cage portions, said generator chamber being confined by an annular wall that extends from said rear end wall, said annular wall being formed with a notch that permits said anchoring lugs to extend therethrough.

6. The light-generating bicycle pedal as claimed in claim 5, wherein said rear end wall further has a mounting post projecting into said notch, each of said anchoring lugs being formed with a positioning hole to permit extension of said mounting post therethrough.

7. The light-generating bicycle pedal as claimed in claim 6, further comprising a cover plate mounted on said pedal body at said mounting post to cover said generator chamber and said open rear end of said board receiving cavity, said cover plate being formed with an axle hole to permit extension of said crank coupling portion therethrough.

8. A light-generating bicycle pedal comprising:

a pedal body formed with a tubular axle sleeve having an axle hole with front and rear ends, a cage member disposed around and connected to said axle sleeve, and a generator chamber disposed adjacent to one of said front and rear ends of said axle hole, said cage member including a pair of lateral cage portions that extend parallel to said axle sleeve and that are disposed respectively on opposite lateral sides of said axle sleeve, at least one of said lateral cage portions having an outer wall surface formed with a board receiving cavity;

an axle extending into said axle hole and coupled rotatably to said axle sleeve; and a light-generating unit including a magnet wheel disposed in said generator chamber and mounted coaxially and co-rotatably on said axle, a coil device disposed in said generator chamber around said magnet wheel and mounted on said pedal body, and a lamp unit connected electrically to said coil device and mounted on said cage member;

said coil device including a spool, a coil wound around said spool, and a pair of conductive caps capped on an assembly of said spool and said coil, each of said conductive caps being connected electrically to a respective end of said coil, said conductive caps being formed with a set of anchoring lugs;

said lamp unit including a circuit board received in said board receiving cavity and having at least one lamp mounted thereon, said circuit board being formed with a set of anchoring holes that permit extension of said set of anchoring lugs therein so as to establish electrical connection between said lamp unit and said coil device;

wherein rotation of said axle relative to said pedal body results in rotation of said magnet wheel relative to said coil device, thereby inducing electrical currents in said coil device that are provided to said lamp unit via said anchoring lugs on said conductive caps so as to enable said lamp unit to generate a light output;

wherein said cage member further includes a front end wall interconnecting said axle sleeve and said lateral cage portions, said front end wall being formed with a lamp-mounting hole, said lamp on said circuit board extending into said lamp-mounting hole.

9. The light-generating bicycle pedal as claimed in claim 8, wherein said cage member further includes a bridging portion that interconnects front ends of said lateral cage portions, said bridging portion being formed with a lamp hole that is registered with said lamp in said lamp-mounting hole, said bicycle pedal further comprising a light-transmissive cover plate mounted on said bridging portion to close said lamp hole.

* * * * *